US008831010B1

(12) United States Patent
Mandal et al.

(10) Patent No.: US 8,831,010 B1
(45) Date of Patent: Sep. 9, 2014

(54) PROVIDING ROUTING INFORMATION FOR WEIGHTED MULTI-PATH ROUTING

(75) Inventors: Subhasree Mandal, San Jose, CA (US); James Wanderer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 13/278,107

(22) Filed: Oct. 20, 2011

(51) Int. Cl.
*H04L 12/28* (2006.01)
(52) U.S. Cl.
USPC .......................................... 370/400
(58) Field of Classification Search
USPC .......................................... 370/366, 389, 400
See application file for complete search history.

(56) References Cited

U.S. PATENT DOCUMENTS

| | | | | |
|---|---|---|---|---|
| 7,277,425 B1 * | 10/2007 | Sikdar | .......................... | 370/366 |
| 7,366,100 B2 * | 4/2008 | Anderson et al. | ............. | 370/237 |
| 8,139,492 B1 | 3/2012 | Peterson et al. | | |
| 2005/0163045 A1 * | 7/2005 | Randriamasy | ................ | 370/229 |
| 2009/0168664 A1 * | 7/2009 | Washburn | ..................... | 370/254 |

OTHER PUBLICATIONS

"Office Action for U.S. Appl. No. 13/278,111", (Jun. 6, 2013), Whole Document.
"Final Office Action for U.S. Appl. No. 13/278,111", (Oct. 22, 2013), Whole Document.

* cited by examiner

*Primary Examiner* — Dang Ton
*Assistant Examiner* — Nourali Mansoury
(74) *Attorney, Agent, or Firm* — Foley & Lardner LLP; Edward A. Gordon

(57) ABSTRACT

Techniques for multi-path routing of packets to a destination node based on multiple routing tables of a router device. In an embodiment, a router device includes port groups which each correspond to a different respective network path to the same destination node. In another embodiment, each routing engine of multiple routing engines in a router device routes packets to the destination node based on a different respective one of multiple routing tables. The routing tables may include respective entry sets which, at least with respect to routing packets to the destination node, dedicate each routing engine to a respective one of the port groups.

15 Claims, 5 Drawing Sheets

PROVIDING ROUTING INFORMATION FOR WEIGHTED MULTI-PATH ROUTING

BACKGROUND

1. Technical Field

This disclosure relates generally to computer networks. Certain embodiments relate to techniques for providing routing information for routing packets to a destination node.

2. Background

In equal-cost multi-path (ECMP) routing techniques, multiple network paths to the same network node are identified as being associated with the same level of strategic cost (or value) in terms of route selection. Conventional ECMP techniques, such as those discussed in the Network Working Group's Request for Comments (RFC) 2991 (November, 2000) and RFC 2992 (November, 2000), may try to send on each of the network paths identified as being of equal-cost the same amount of traffic to the destination node.

As data networks trend towards increased size, complexity and speed, mechanisms such as those for implementing various types of multi-path routing are burdened with the increasingly difficult task of supporting sufficiently fast and efficient routing in such networks. For example, the number of entries in a routing table of a conventional router device tends to grow exponentially with increasingly complex routing configurations in increasingly large-scale networks. Moreover, the overhead of managing and searching such a large routing table impacts router operations which are under increasingly time-constrained performance parameters.

SUMMARY OF THE INVENTION

Embodiments discussed herein include various techniques for providing routing information for a router device to implement weighted multi-path routing. In an embodiment, a router device includes multiple routing engines, each of which is to detect respective packets that are destined for the same destination node. Egress ports of the router device may comprise port groups which each correspond to a different respective network path to the destination node. The different respective network paths may, for example, be equal-cost paths with respect to one another.

Moreover, the router device may include multiple routing tables, each of which is to correspond to a different respective one of the multiple routing engines. Each of the multiple routing tables may include a respective entry set for routing packets to the destination node—e.g. for various ECMP routing via the equal-cost network paths. At least with respect to the routing of packets to the destination node, the entry sets may dedicate the routing engines each to a respective one of the port groups. In an embodiment, each of the multiple routing engines is to route its respective packets to the destination node based on the routing table which corresponds to that routing engine.

BRIEF DESCRIPTION OF THE DRAWINGS

One or more embodiments of the subject matter described in this specification are illustrated by way of example, and not by way of limitation, in the figures of the accompanying drawings.

DETAILED DESCRIPTION

Figure 1:
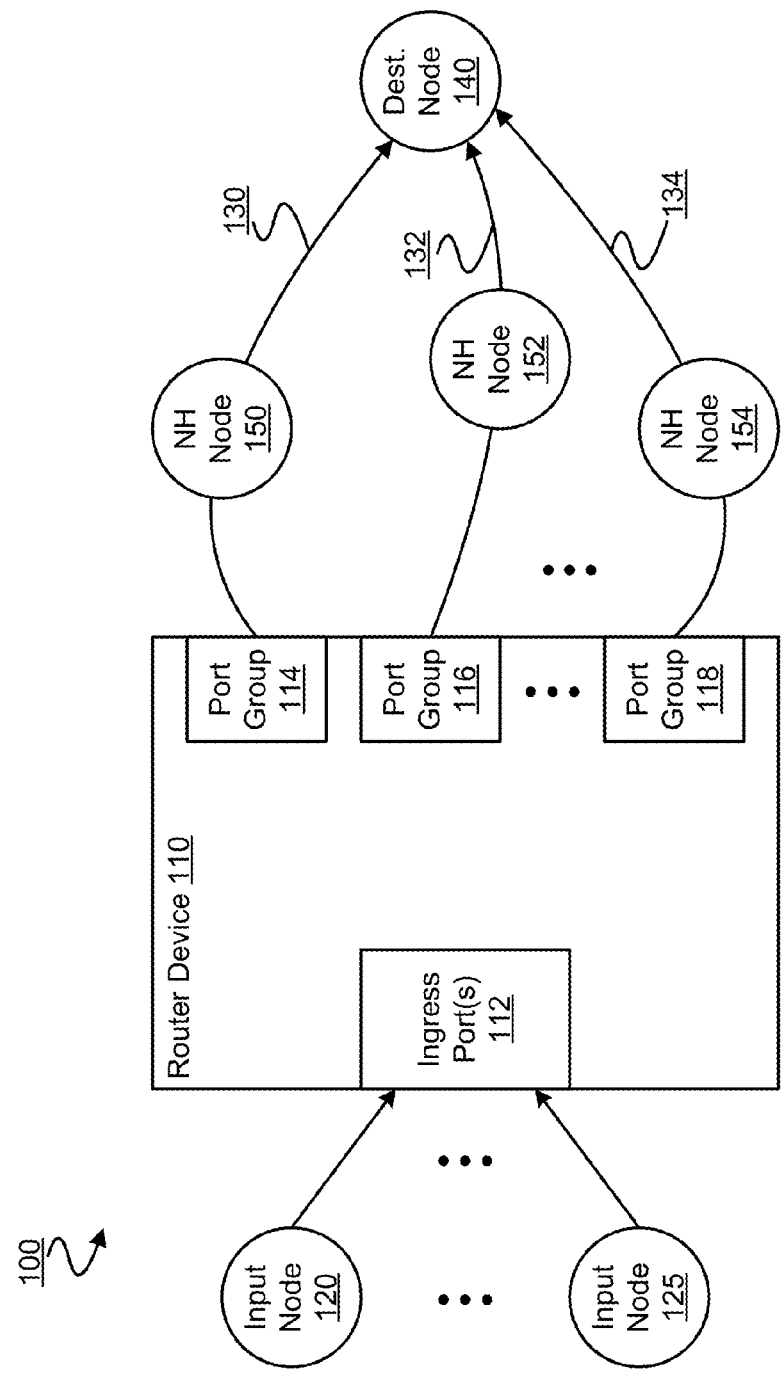
FIG. 1 is a block diagram illustrating example elements of a network for routing packets according to an embodiment.

FIG. 1 illustrates elements of a network 100 for routing data packets according to an embodiment. Network 100 may, for example, include a network, such as a data center, which is located in a single room of a building. Additionally or alternatively, network 100 may include one or more component networks which cover a larger geographic area. By way of illustration and not limitation, network 100 may comprise one or more wired and/or wireless networks including, but not limited to a wide area network (WAN), local area network (LAN), Internet, terrestrial network, satellite network, and/or the like.

Network 100 may include a router device 110 and a destination node 140 to which router device 110 routes certain data packets (or simply "packets"). Router device 110 may implement routing to select for each of multiple packets a respective path in network 100 between router device 110 and destination node 140. For example, router device 110 may implement a novel type of multi-path routing to forward IP or other such data packets to destination node 140—e.g. as an Open Systems Interconnection (OSI) Layer 3 device.

Routing by router device 110 may, for example, include routing according to equal-cost multi-path (ECMP) routing techniques, although certain embodiments are not limited in this regard. For example, although certain embodiments provide features which resolve problems posed in various ECMP routing contexts, such embodiments may not be limited to use in such ECMP routing contexts. Various embodiments are discussed herein with reference to multi-path routing applications. Such multi-path routing may include, for example ECMP routing of packets across respective ones of multiple network paths which are equal-cost paths with respect to one another.

Router device 110 may include one or more ingress ports 112 to receive packets which are to be sent to destination node 140. In an embodiment, the one or more ingress ports 112 may include all ports of router device 110 which receive packets to be routed to destination node 140 via multiple equal-cost network paths—e.g. the illustrative network paths 130, 132, ... 134. By way of illustration and not limitation, ingress ports 112 may include all ports of router device 110 which are to receive packets for routing to destination node 140. The one or more ingress ports 112 may, in certain embodiments, receive packets for routing to other destination nodes and/or paths (not shown). The router device 110 may, in certain embodiments, include one or more additional ingress ports (not shown) for receiving packets other than those packets which are to be sent to destination node 140 via the illustrative paths 130, 132, ..., 134.

In an embodiment, network 100 may include one or more input nodes 120, ..., 125 to provide to the one or more ingress ports 112 certain packets destined for destination node 140. The one or more input nodes 120, ..., 125 may variously include any of a variety of network communication devices including, but not limited to, one or more of a bridge, gateway, firewall, switch, server and/or the like. Input nodes 120, ..., 125 may, in an embodiment, provide all packets which router device 110 is to route to destination node 140. Alternatively or in addition, input nodes 120, . . . , 125 may each provide a substantially equal amount of traffic for destination node 140 over time, although certain embodiments are not limited in this regard. Router device 110 may receive other network traffic from the one or more input nodes 120, . . . , 125 and/or from one or more additional input nodes (not shown).

In network 100, router device 110 may include multiple port groups 114, 116, . . . , 118 to variously couple to destination node 140. Although discussed herein in terms of an illustrative port groups 114, 116, . . . , 118, such discussion may be extended to apply to any of a variety of additional or alternative combinations of two or more port groups of router device 110. Each of the multiple port groups 114, 116, . . . , 118 includes one or more ports (not shown), and may correspond to a respective network path to destination node 140. For example, each port of a given port group may send one or more respective packets to destination node 140 via—e.g. only via—the network path corresponding to that port group.

In an embodiment, some or all of the ports of a given port group may also send packets to other destination nodes (not shown). Additionally or alternatively, some or all of the ports of a given port group may also receive one or more packets to be routed by router device 110. Additionally or alternatively, router device 110 may include one or more additional egress ports (not shown) for sending packets other than those sent to destination 140 via network paths 130, 132, . . . , 134.

As used herein, "network path" refers to a set of one or more network nodes and/or inter-node channels. In an embodiment, a network path may, for example, include two adjacent network nodes, where the path is inclusive of all channels between the two adjacent network nodes. In an embodiment, each of network paths 130, 132, . . . , 134 includes a respective one or more nodes and/or inter-node channels which is/are not included in another of network paths 130, 132, . . . , 134. In certain embodiments, one of network paths 130, 132, . . . , 134 may partially, and only partially, overlap with another of network paths 130, 132, . . . , 134. For example, although not shown in network 100, a next-hop node for router device 110 may belong to two different network paths to destination node 140, where the two network paths diverge from one another between this common next-hop node and destination node 140.

Network 100 may include next-hop nodes 150, 152, . . . , 154 for router device 110 which belong, respectively, to network paths 130, 132, . . . , 134 between router device 110 and destination node 140. Next-hop nodes 150, 152, . . . , 154 may variously include any of a variety of network communication devices including, but not limited to, one or more of a bridge, gateway, firewall, switch, server and/or the like. In an embodiment, port groups 114, 116, . . . , 118 may correspond, respectively, to network paths 130, 132, . . . , 134—e.g. at least insofar as any ports in a given port group are coupled to the next-hop node of the network path corresponding to that port group.

In an embodiment, network 100 may be characterized by some topological and/or other network symmetry—e.g. at least with respect to the receiving by router device 110 of packets for destination node 140. For example, input nodes 120, . . . , 125 may implement similar or even identical connectivity with router device 110. Alternatively or in addition, input nodes 120, . . . , 125 may each have similar or even identical data communication bandwidth with router device 110. Network 100 may, for example, include a highly symmetric network such as a Clos network. In such embodiment, multiple switching points, data channels, and/or the like in network 100 may operate very much the same, at least from the point of view of router device 110.

Accordingly, one or more regular patterns of data traffic may be experienced by router device 110. By having such symmetry, network 100 may exchange traffic in a very evenly distributed manner. For example, router device 110 may receive packets for destination node 140 at similar or even identical amounts from the input nodes 120, . . . , 125. Additionally or alternatively, packets for destination node 140 may be similarly or even identically distributed among multiple routing engines (not shown) within router device 110. Certain embodiments variously exploit such symmetry to provide mechanisms for reducing the amount of routing information used to route packets to destination node 140.

Figure 2:
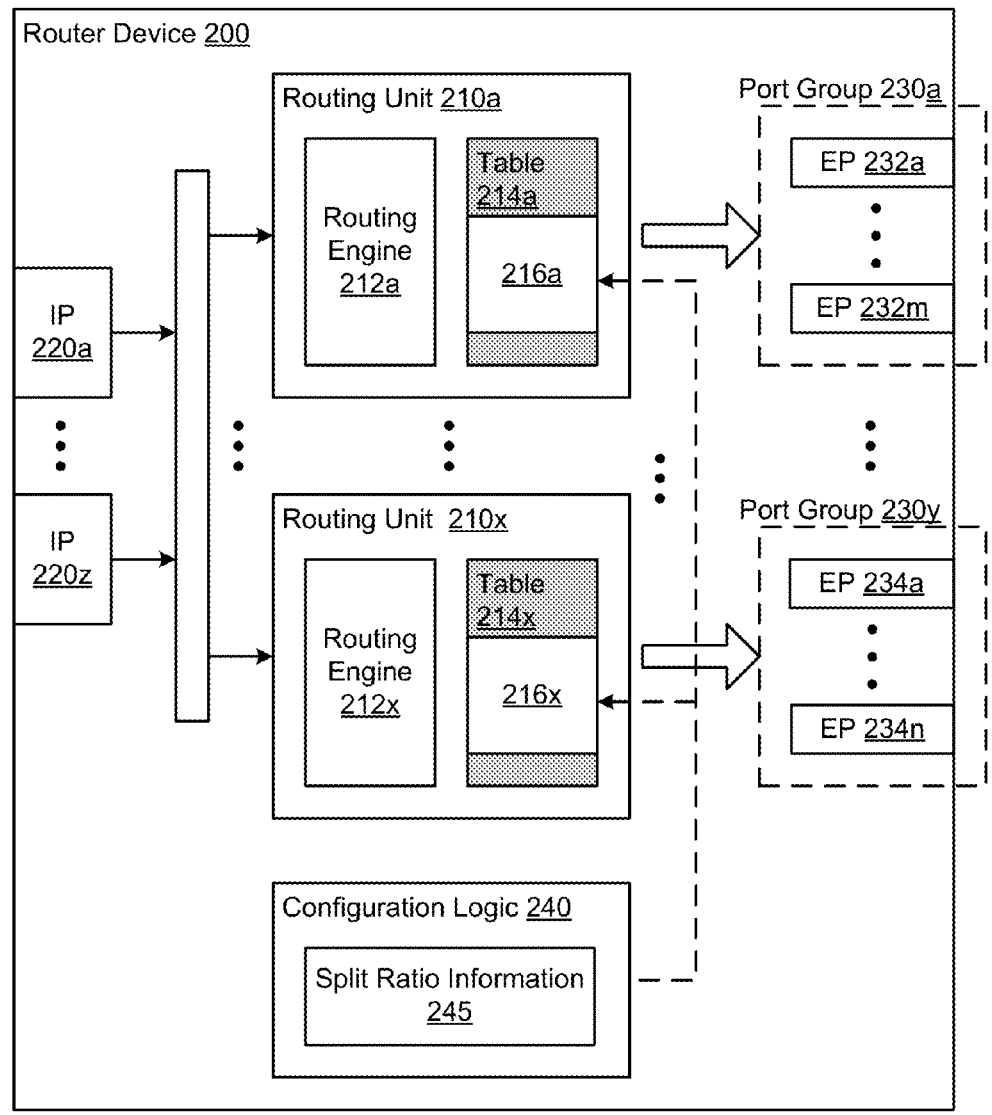
FIG. 2 is a block diagram illustrating example elements of a router device for routing packets to a destination node according to an embodiment.

FIG. 2 illustrates select elements of a router device 200 for providing routing information according to an embodiment. Router device 200 may, for example, include some or all of the features of router device 110.

Router device 200 may receive packets to be sent to a destination device such as destination device 140. Features of router device 200 are discussed herein with respect to the routing of packets to a particular destination node via multiple network paths. For example, the packets may be variously received via one or more ingress ports 220a, . . . , 220z of router device 200, and variously sent to the destination node via ports of multiple port groups 230a, . . . , 230y in router device 200. Routing information may be provided via elements within router device 200 to implement such routing to the destination node in question. Elements of router device 200 for routing packet to the destination node in question are not necessarily limiting on whether or how elements of router device 200 might, in certain embodiments, also receive and/or route other packets in a network.

In an embodiment, router device 200 includes one or more ingress ports 220a, . . . , 220z to receive from one or more input nodes (not shown) packets which are to be sent to a destination node (not shown). Although shown as including illustrative ingress ports 220a, . . . , 220z, router device 200 may include any of a variety of additional or alternative combinations of one or more such ingress ports. Router device 200 may include port groups 230a, . . . , 230y for sending to the destination node in question packets received via the one or more ingress ports 220a, . . . , 220z. Although shown as including an illustrative port groups 230a, . . . , 230y, router device 200 may include any of a variety of additional or alternative combinations of port groups for sending packets to the same destination node. In an embodiment, each of port groups 230a, . . . , 230y corresponds to a different respective one of equal-cost network paths to the destination node.

By way of illustration and not limitation, a given one of port group 230a, . . . , 230y may correspond to a particular network path at least insofar as every port in that port group sends packets to the destination node via that particular network path. For the purpose of illustrating certain features of various embodiments, port group 230a is shown as including egress ports 232a, . . . , 232m, and port group 230y is shown as including egress ports 234a, . . . , 234n. However, router device 200 may include any of a variety of additional or alternative combinations of multiple port groups, and/or any of a variety of additional or alternative combinations of ports comprising such port groups.

Router device 200 may include multiple routing units, represented by illustrative routing units 210a, . . . , 210x. As used herein, "routing unit" refers to a set of resources for determining a routing for a packet and for initiating or otherwise providing any packet processing needed to implement the determined routing. For a given packet received by the one or more ingress ports 220a, . . . , 220z, routing of the packet may be assigned to, or otherwise performed by, one of routing units 210a, . . . , 210x. In an embodiment, routing units 210a, . . . , 210x may each route packets independent of one another.

Packets to be sent to a particular destination node via a multi-path routing may be distributed evenly among the routing units 210a, . . . , 210x over time—e.g. due to ingress ports 220a, . . . , 220z distributing such packets evenly among routing units 210a, . . . , 210x and/or due to a symmetry of such packets being provided to ingress ports 220a, . . . , 220z. Routing units 210a, . . . , 210x may variously include, or otherwise have access to, a respective one of routing engines 212a, . . . , 212x. In an embodiment, a routing engine includes logic—e.g. any of a variety of combinations of hardware, firmware and/or executing software—for detecting the receiving of a packet and for accessing data to determine a routing of that packet—or a modified version thereof—to an intended destination node.

A routing engine may, for example, perform one or more of analyzing information in a packet, searching a reference data structure to identify routing information associated with such information, optionally modifying the packet by adding and/or removing information therefrom, and initiating switching logic of router device 200 to direct the packet to a particular egress port. In an embodiment, a routing unit may include, or otherwise have access to, a buffer or other means (not shown) for storing a packet during such operations performed by the routing engine of the routing unit.

Router device 200 may include one or more additional routing units (not shown)—e.g. for routing other than that which sends packets to the destination node via the equal-cost paths associated with port groups 230a, . . . , 230y. As discussed herein, each one of routing engines 212a, . . . , 212x may—at least with respect to routing packets to a particular destination node—be dedicated to a respective one (and only one) of port groups 230a, . . . , 230y. By way of illustration and not limitation, routing engine 212a may route packets to the destination node only through egress ports 232a, . . . , 232m of port group 230a, while routing engine 212x may route packets to the destination node only through egress ports 234a, . . . , 234n of port group 230y. The dedications (with respect to routing to a particular destination node) of routing engines to respective port groups in router device 200 is merely illustrative, and router device 200 may implement any of a variety of additional or alternative such dedications.

In an embodiment, a total number of port groups 230a, . . . , 230y is less than or equal to a total number of routing engines 212a, . . . , 212x. In such an embodiment, each of routing engines 212a, . . . , 212x may, for example, be dedicated to only one of port groups 230a, . . . , 230y, and each of port groups 230a, . . . , 230y may have one or more of routing engines 212a, . . . , 212x dedicated to it. Dedication of routing engines 212a, . . . , 212x to respective ones of port groups 230a, . . . , 230y may be implemented, for example, by a particular distributing of routing information within router device 200.

For example, routing units 210a, . . . , 210x may include, or otherwise have access to, equal-cost multi-path (ECMP) routing tables 214a, . . . , 214x, respectively—e.g. where each of routing tables 214a, . . . , 214x corresponds to a different respective one of routing engines 212a, . . . , 212x. By way of illustration and not limitation, of routing tables 214a, . . . , 214x, routing engine 212a may only access routing table 214a for routing packets to the destination node. Similarly, of routing tables 214a, . . . , 214x, routing engine 212x may only access routing table 214x for routing packets to the destination node. Accordingly, in certain embodiments, each one of multiple routing engines used to route packets from a router device to a particular destination node may do so with reference to a respective routing table which is specific to that routing engine.

Each of routing tables 214a, . . . , 214x may include a respective set of one or more routing table entries—referred to herein as an entry set—for multi-path routing of respective packets to the destination node, each via a respective one of multiple network paths. In an embodiment, an entry set of a given routing table may include all entries of that routing table which are for routing packets to the destination node. Additionally of alternatively, each entry in an entry set of a given routing table may be for routing via the port group to which that routing table corresponds.

By way of illustration and not limitation, an entry set 216a of routing table 214a may only include entries for egress ports 232a, . . . , 232m of port group 230a, and entry set 216x of routing table 214x may only include entries for egress ports 234a, . . . , 234n of port group 230y. In an embodiment, a port group based distribution of routing table entries among the entry sets 216a, . . . , 216x may implement a dedication of routing engines 212a, . . . , 212x each to a different respective one of port groups 230a, . . . , 230y—at least with respect to multi-path routing of packets to the destination node. In an embodiment, router device 200 may include, or otherwise couple to, configuration logic 240 comprising hardware, firmware and/or executing software to perform such a distribution of routing table entries among the entry sets 216a, . . . , 216x.

Configuration logic 240 may, for example, coordinate operation within some or all of routing units 210a, . . . , 210x and/or between some or all of routing units 210a, . . . , 210x. In certain embodiments, some or all of configuration logic 240 may be distributed in one or more of routing units 210a, . . . , 210x. For example, configuration logic 240 may coordinate access to bus, multiplexing, switching and/or other such mechanisms of router device 200 which exchange packets from an ingress port to a routing unit and/or provide, based on a route identified by the routing unit, packets to an egress port. Although certain illustrative elements of such bus, multiplexing, switching and/or other such mechanisms are represented functionally in router device 200, functionality of these elements may be implemented according to any of a variety of conventional network router architecture elements, in certain embodiments.

In an embodiment, configuration logic 240 may distribute routing table entries of entry sets 216a, . . . , 216x based on split ratio information 245 which describes a relative splitting of traffic to the destination node among port groups 230a, . . . , 230y. For example, split ratio information 245 may indicate that a first port group is to carry a first portion of traffic being routed to the destination node, and that a second port group is to carry a second portion of that traffic being routed to the packet node. In an embodiment, the first portion of traffic is different from—e.g. larger than or smaller than—the second portion of traffic. The term "weighted routing" is used herein to refer to routing in which respective contributions are specified (for example, by split ratio information) for different port groups, each respective contribution to the overall routing of some traffic to a given destination node.

Split ratio information 245 may specify or otherwise indicate respective shares of traffic to be carried by port groups 230a, . . . , 230y—e.g. where the respective shares are specified relative to one another. By way of illustration and not limitation, split ratio information 245 may specify a first port group, second port group and third port group are to carry, respectively, two times (2×), one time (1×) and one time (1×)

a basic share of all traffic being routed to the destination node by the multiple routing engines 212a, . . . , 212x. Based on split ratio information 245, configuration logic 240 may create, modify, or otherwise generate entry sets 216a, . . . , 216x in respective ones of routing tables 214a, . . . , 214x which are for routing packets to the destination node via the respective network paths corresponding to the port groups 230a, . . . , 230y.

Figure 3:
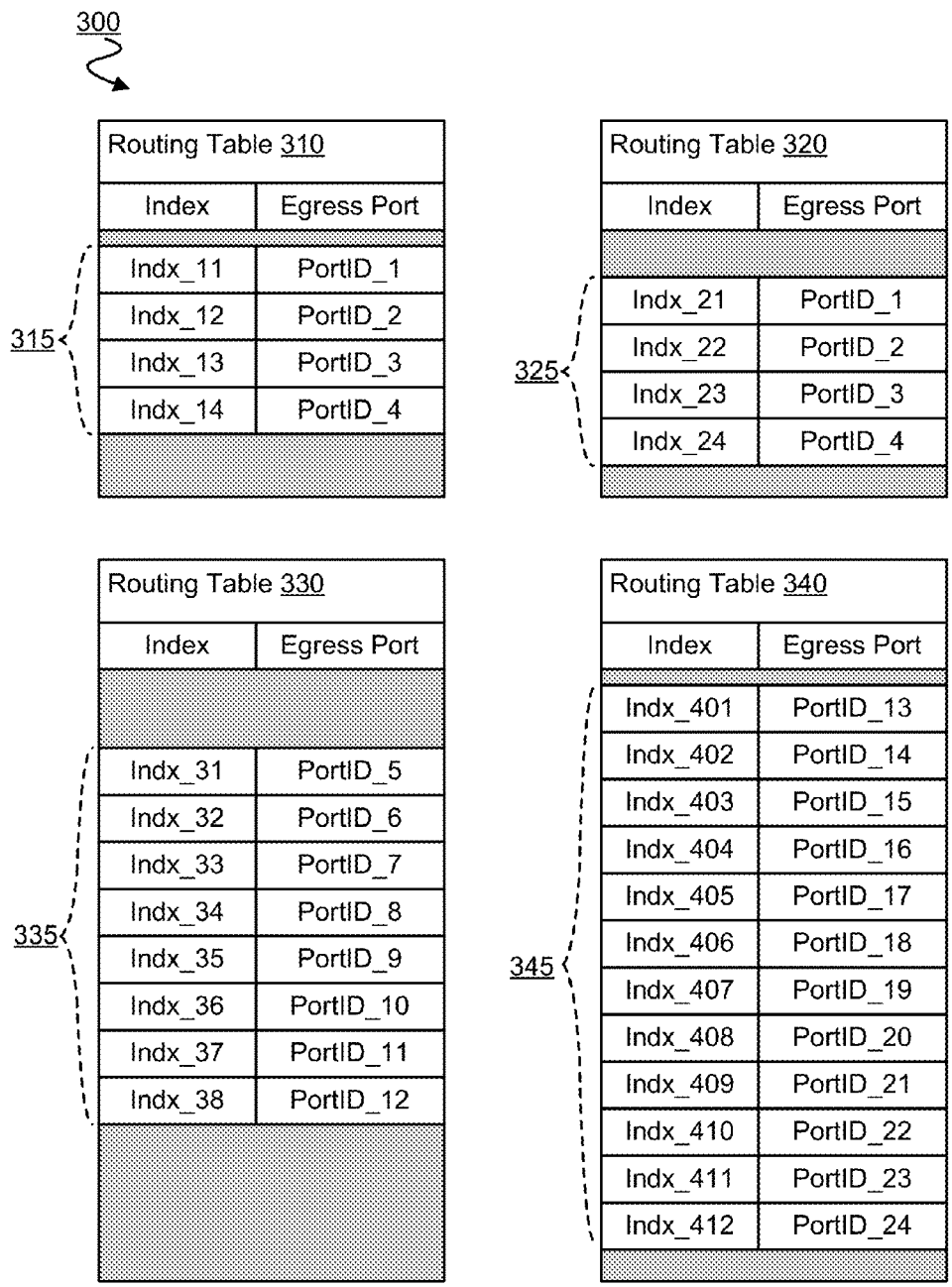
FIG. 3 is a block diagram illustrating example elements of routing information for weighted multi-path routing according to an embodiment.

FIG. 3 illustrates select elements of a set of routing information 300 for routing packets to a destination node according to an embodiment. By way of illustration and not limitation, routing information 300 may include routing tables 310, 320, 330, 340. Routing information may include any of a variety of additional or alternative combinations of multiple routing tables, in various embodiments. Further, the particular entries shown in routing tables 310, 320, 330, 340 are merely illustrative of certain features, and are not limiting on various embodiments.

In an embodiment, routing tables 310, 320, 330, 340 each correspond to a different respective routing engine of a router device. For example, of routing tables 310, 320, 330, 340, only a respective one routing table may be accessed by each of the routing engines for routing packets to the destination node.

Routing tables 310, 320, 330, 340 may include, respectively, entry sets 315, 325, 335, 345 for the variously routing of packets to a destination node via equal-cost network paths. An entry set of a given routing table may, for example, include all entries of that routing table which are for routing packets to a particular destination node. In certain embodiments, some or all of routing tables 310, 320, 330, 340 may include additional entries (not shown)—e.g. for routing other than that which sends packets to the destination node via the port groups to which the routing engines are dedicated.

In the discussion of routing information 300, certain features of various embodiments are described in terms of an illustrative splitting of traffic to a destination node among three port groups. It should be understood that the discussion of such features may be extended to apply to any of a variety of additional or alternative traffic splitting schemes. In an illustrative scenario, a router device includes three port groups: a Group A having four (4) ports, a Group B having eight (8) ports and a Group C having twelve (12) ports. The Groups A-C each correspond to a different respective one of multiple network paths to the same destination node. Split ratio information may indicate that traffic to the destination node by the Groups A-C is to be divided into shares according to the following:

| Port Group | Ports | Share(s) of Traffic to Destination Node |
|---|---|---|
| Group A | 1-4 | 2 |
| Group B | 5-12 | 1 |
| Group C | 13-24 | 1 |

The splitting of traffic to the destination node among the port groups may be characterized by a measure of granularity—e.g. where the granularity value is equal to a total number of shares for all port groups. For example, the division of traffic into a total of four (2+1+1=4) shares may correspond to a granularity value of four (4) for the splitting scheme. By contrast, a granularity of a traffic splitting scheme may be equal to 100 in another scenario—for example, where traffic splitting is specified in integer percentages of the overall traffic to a destination node. In an embodiment, a splitting scheme may be normalized to reduce its granularity value— e.g. where the respective numbers of traffic shares allocated to each port group are all divisible by some common denominator greater than one (1).

Based on the split ratio information, each of the routing engines corresponding, respectively, to routing tables 310, 320, 330, 340 may, at least with respect to routing traffic to the destination node, be dedicated to a different respective one (and only one) of Groups A-C. In certain embodiments, routing units 210a, . . . , 210x are selected from among all routing units of router device 200. For example, the total number of selected routing engines may be equal to a granularity value of a traffic splitting scheme. In an embodiment, a ratio of a total number of routing tables for one port group to a total number of routing tables for another port group may be equal to, or otherwise based on, a ratio of the traffic to be split among those port groups. By way of illustration and not limitation, the indicated 2-1-1 splitting of traffic among Groups A, B and C, respectively, may lead to configuration logic identifying (1) that a certain number of routing engines are to be dedicated to routing packets for Group B, (2) that the same number of routing engines are to be dedicated to routing packets for Group C, and (3) that twice that number of routing engines are to be dedicated to routing packets for Group A.

To implement such dedicating of routing engines to respective ones of Groups A-C, the configuration logic may distribute entry sets 315, 325, 335, 345 to their respective routing tables 310, 320, 330, 340. For example, each of entry sets 315, 325 may include only entries which are for routing through ports of Group A, where entry set 335 includes only entries which are for routing through ports of Group B, and where entry set 345 includes only entries which are for routing through ports of Group C. In an embodiment, each of entry sets 315, 325, 335, 345 may include only one respective entry for each of the ports in the respective port group to which its corresponding routing engine is dedicated. By way of illustration and not limitation, entry sets 315, 325 may each include only one respective entry for each of ports 1-4 that belong to Group A, where entry set 335 includes only one respective entry for each of ports 5-12 that belong to Group B, and where entry set 345 includes only one respective entry for each of ports 13-24 that belong to Group C. In an embodiment, for each of the Groups A-C, a total number of ports of that port group is equal to a total number of entries in the entry set for each routing engine which is dedicated to that port group.

With entry sets 315, 325, 335, 345 distributed to their respective routing tables 310, 320, 330, 340, multi-path routing to the destination node may be performed—e.g. where traffic is split (equally or unequally) across port groups of the router device. For example, routing engines of a router device may each detect that respective packets has been received. In response to such detecting, the routing engines may each identify a respective routing table entry, each identified entry for a routing of a respective packet.

Identifying a routing table entry may, for example, include performing a lookup of a routing table which, at least for routing packets to the destination node, is specific to a particular one of the routing engines. In an embodiment, a routing table entry may be identified based on a hash of information in a received packet. For example, a hash of an IP destination field (or other destination field), a flow identifier, and/or other such packet information may calculate an index value which identifies a routing table entry. Based on egress port information within, or otherwise associated with, the identified routing table entry, a routing engine may determine that the packet is to be put in a bucket for a particular port.

With routing information 300, routing engines of a router device may efficiently achieve a desired splitting—e.g. an unequal splitting—of traffic among port groups. For example, a total number of entries in the entry sets 315, 325, 335,345 may be significantly less than a total number of routing table entries needed to achieve such splitting according to other techniques.

In one such other technique, a single routing table stores all routing table entries for a router device to implement the above-described 2-1-1 splitting among Group A (4 ports), Group B (8 ports) and Group C (12 ports). According to such a technique, each of Groups A-C correspond to a respective sub-set of an entry set in the one routing table, where the entry set is for all routing of packets to the destination node via equal-cost paths for Groups A-C.

Since the single routing table is to be a reference for all packet routing according to the 2-1-1 splitting scheme, the respective total numbers of the entries in each sub-set must be proportional to one another according to the 2-1-1 splitting scheme. Moreover, since a given port group is to equally distribute ECMP traffic to the destination node across all ports of that port group, a given sub-set must have an equal number of entries for each port in the port group which corresponds to that sub-set. Accordingly, the respective total number of the entries in each of the sub-sets must be some integer multiple of the number of ports in the corresponding port group.

For example, since Group B and Group C are each to support a single respective share of traffic to the destination node, the respective sub-sets of entries for Group B and Group C in the single routing table each include the same total number of entries. More particularly, the total number of routing table entries for either of Group B and Group C is some common multiple of 8 and 12—e.g. 24, 48, 96, etc. Due in part to the fact that twenty-four (24) is a common multiple of 8 and 12 which is also divisible by four (4)—the number of ports in Group A—the single routing table can implement the 2-1-1 splitting only with at least 96 routing table entries—e.g. 48 routing table entries for Group A, 24 routing table entries for Group B and 24 routing table entries for Group. By contrast, routing information 300 implements the same traffic splitting with only 28 entries—that is, by distributing the entries on a per port group basis across routing tables which each correspond to different respective routing engine of the router device. The 28 entries are variously located, for example, in respective ones of the routing tables 310, 320, 330, 340, where each of the routing tables 310, 320, 330, 340 is for a different respective routing engine—e.g. for a different respective routing integrated circuit (IC) chip of a router device. In the illustrative embodiment shown in FIG. 3, none of the routing tables 310, 320, 330, 340 includes more than 12 entries—illustrating a reduction of the number of entries any one routing engine must search through to implement its respective contribution to a weighted multi-path routing.

The above-described single routing table used for routing packets to the destination node is subject to requiring very large numbers of entries—e.g. depending on a total number of port groups, a total numbers of ports in each port group, a granularity of traffic splitting and/or a relative ratio of traffic shares to be allocated to the port groups. By contrast, the techniques for providing routing information 300 scale more linearly, rather than exponentially, with increasingly complex schemes for splitting traffic across port groups.

Figure 4:
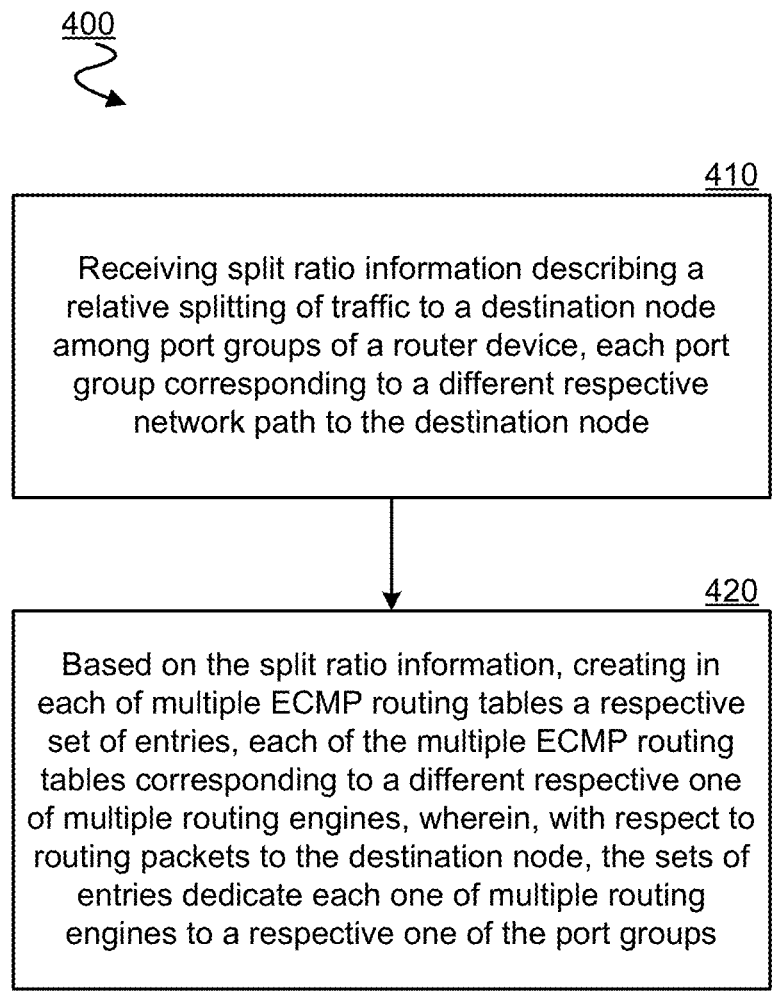
FIG. 4 is a flow diagram illustrating elements of an example method for providing routing information for weighted multi-path routing according to an embodiment.

FIG. 4 illustrates select elements of a method 400 for creating routing information according to an embodiment. Method 400 may be performed by configuration logic 240, for example, or other such logic to configure one or more routing tables of a router device.

In an embodiment, method 400 includes, at 410, receiving split ratio information describing a relative splitting of traffic to be sent to a destination node, the splitting among port groups of the router device. Each of the port groups may, in an embodiment, correspond to a different respective network path to the destination node. Based on the split ratio information, method 400 may, at 420, create in each of multiple routing tables of the router device a respective entry set, where each of the multiple routing tables corresponds to a different respective one of multiple routing engines of the router device. The entry sets may, in an embodiment, be specific to implementing weighted routing via multiple network paths.

In an embodiment, the entry sets created based on the split ratio information may, with respect to routing packets to the destination node, dedicate each one of multiple routing engines to a respective one of the port groups. For example, of the port groups of the router device, routing via a port or ports of only one port group may be indicated by the entries of a given entry set.

Figure 5:
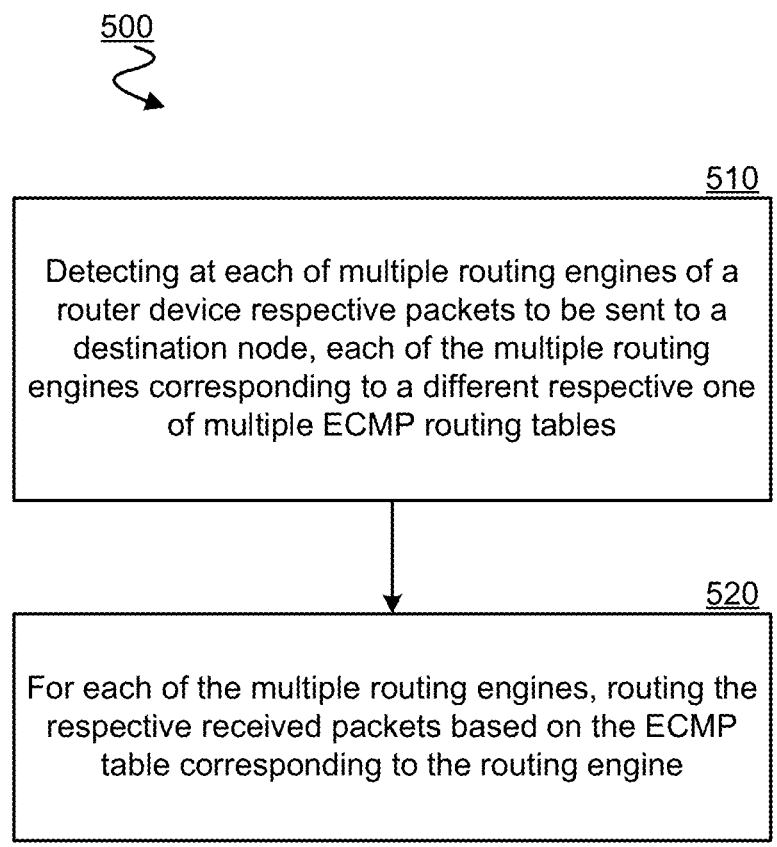
FIG. 5 is a flow diagram illustrating elements of an example method for weighted routing of packets based on multi-path routing information according to an embodiment.

FIG. 5 illustrates select elements of a method 500 for routing packets to a destination node according to an embodiment. Method 500 may be performed, for example, by a router device including some or all of the features of router device 200. In an embodiment, method 500 includes, at 510, detecting at each of multiple routing engines of a router device respective packets to be sent to a destination node, each of the multiple routing engines corresponding to a different respective one of multiple routing tables.

Egress ports of the router device may each couple to a respective next-hop node for the router device. In an embodiment, the egress ports comprise port groups which each correspond to a different respective network path to the destination node. Furthermore, at 520, method 500 may include, for each of the multiple routing engines, routing the respective received packets based on the ECMP table which corresponds to the routing engine. Each of the routing tables may, for example, include a respective entry set for routing packets to the destination node via a respective one of the port groups. In an embodiment, the entry sets are created based on split ratio information describing a relative splitting among the port groups of traffic to be sent to the destination node—e.g. as per method 400.

Techniques and architectures for providing routing information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A router device comprising:
   multiple routing engines each to detect respective packets which are to be sent to a destination node;
   egress ports each configured to couple to a respective next-hop node for the router device, wherein the egress ports comprise port groups which each correspond to a different respective network path to the destination node, wherein for each of the port groups, each egress port of the port group is configured to couple the router device to the destination node via the corresponding respective network path, wherein one or more of the port groups each include multiple egress ports;
   multiple routing tables each corresponding to a different respective one of the multiple routing engines, wherein, of the multiple routing tables, each respective routing engine is configured to perform routing to the destination node with only the routing table corresponding to the respective routing engine, wherein, for each of the multiple routing engines, the routing engine is further configured to perform packet routing based on the routing table corresponding to the routing engine; and
   configuration logic configured to receive split ratio information describing a relative splitting of traffic to the destination node and, based on the relative splitting, to dedicate each of the multiple routing engines, with respect to performance of routing packets to the destination node, to a respective one of the port groups, including:
   for each of the multiple routing tables, the configuration logic is configured to configure the routing table to include a respective entry set for performance of equal-cost multi-path (ECMP) routing of packets to the destination node, wherein the respective entry set includes all entries of the routing table which are for the performance of routing packets to the destination node, and wherein, of the port groups, the respective entry set includes only entries for ports of the port group to which is dedicated the routing engine corresponding to the routing table.

2. The router device of claim 1, wherein the split ratio information indicates that a first amount of traffic to the destination node via a first one of the port groups is larger than a second amount of traffic to the destination node via a second one of the port groups.

3. The router device of claim 1, wherein the configuration logic is configured to create an entry set based on a granularity value for the split ratio information.

4. The router device of claim 3, wherein the multiple routing engines are selected based on the granularity value.

5. The router device of claim 1, wherein, for each of the port groups, a total number of ports of that port group is equal to a total number of entries in the entry set for each routing engine which is dedicated to that port group.

6. A method comprising:
   receiving split ratio information describing a relative splitting of traffic to a destination node;
   based on the relative splitting, dedicating each of multiple routing engines of a router device, with respect to performance of routing of packets to the destination node, to a respective one of multiple port groups of the router device, each of the multiple routing engines corresponding to a different respective one of multiple routing tables of the router device, wherein, each respective routing table of the multiple routing engines is to perform routing to the destination node with only the routing table corresponding to the respective routing engine, wherein egress ports of the router device comprise the multiple port groups, wherein one or more of the port groups each include multiple egress ports, and wherein the multiple port groups each correspond to a different respective network path to the destination node, wherein for each of the multiple port groups, each egress port of the port group couples the router device destination node via the corresponding respective network path, the dedicating including:

for each of the multiple routing tables, configuring the routing table to include a respective entry set for performance of equal-cost multi-path (ECMP) routing of packets to the destination node, wherein the respective entry set includes all entries of the routing table which are for performance of routing packets to the destination node, and wherein, of the port groups, the respective entry set includes only entries for ports of the port group to which is dedicated the routing engine corresponding to the routing table.

7. The method of claim 6, wherein the split ratio information indicates that a first amount of traffic to the destination node via a first one of the multiple port groups is larger than a second amount of traffic to the destination node via a second one of the multiple port groups.

8. The method of claim 6, wherein an entry set is created based on a granularity value for the split ratio information.

9. The method of claim 8, wherein the multiple routing engines are selected based on the granularity value.

10. The method of claim 6, wherein, for each of the multiple port groups, a total number of ports of that port group is equal to a total number of entries in the entry set for each routing engine which is dedicated to that port group.

11. Non-transitory computer-readable storage media having stored thereon instructions which, when executed by one or more processing units, cause the one or more processing units to perform a method comprising:
receiving split ratio information describing a relative splitting of traffic to a destination node;
based on the relative splitting, dedicating each of multiple routing engines of a router device, with respect to performance of routing of packets to the destination node, to a respective one of multiple port groups of the router device, each of the multiple routing engines corresponding to a different respective one of multiple routing tables of the router device, wherein each of the respective multiple routing engines is configured to perform routing to the destination node with only the routing table corresponding to the respective routing engine, wherein egress ports of the router device comprise the multiple port groups, wherein one or more of the port groups each include multiple egress ports, and wherein the multiple port groups each correspond to a different respective network path to the destination node, wherein for each of the multiple port groups, each egress port of the port group couples the router device to the destination node via the corresponding respective network path, the dedicating including:
for each of the multiple routing tables, configuring the routing table to include a respective entry set for performance of equal-cost multi-path (ECMP) routing of packets to the destination node, wherein the respective entry set includes all entries of the routing table which are for the performance of routing packets to the destination node, and wherein, of the port groups, the respective entry set includes only entries for ports of the port group to which is dedicated the routing engine corresponding to the routing table.

12. The computer-readable storage media of claim 11, wherein the split ratio information indicates that a first amount of traffic to the destination node via a first one of the multiple port groups is larger than a second amount of traffic to the destination node via a second one of the multiple port groups.

13. The computer-readable storage media of claim 11, wherein an entry set is created based on a granularity value for the split ratio information.

14. The computer-readable storage media of claim 13, wherein the multiple routing engines are selected based on the granularity value.

15. The computer-readable storage media of claim 11, wherein, for each of the multiple port groups, a total number of ports of that port group is equal to a total number of entries in the entry set for each routing engine which is dedicated to that port group.

* * * * *